US011537132B2

(12) United States Patent
Kim et al.

(10) Patent No.: US 11,537,132 B2
(45) Date of Patent: Dec. 27, 2022

(54) MOBILE ROBOT AND METHOD FOR OPERATING THE SAME

(71) Applicant: LG ELECTRONICS INC., Seoul (KR)

(72) Inventors: Da Eun Kim, Seoul (KR); Sang Hak Lee, Seoul (KR); Nak Yeong Kim, Seoul (KR); Sung Jin Kim, Seoul (KR); Sungmin Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 16/845,742

(22) Filed: Apr. 10, 2020

(65) Prior Publication Data

US 2021/0149405 A1 May 20, 2021

(30) Foreign Application Priority Data

Nov. 19, 2019 (KR) .................... 10-2019-0148914

(51) Int. Cl.
*G05D 1/02* (2020.01)
*G05D 1/12* (2006.01)
*G05D 1/00* (2006.01)
*B60W 60/00* (2020.01)

(52) U.S. Cl.
CPC ..... *G05D 1/0214* (2013.01); *B60W 60/00256* (2020.02); *G05D 1/0094* (2013.01); *G05D 1/0242* (2013.01); *G05D 1/0246* (2013.01); *G05D 1/0255* (2013.01); *G05D 1/12* (2013.01)

(58) Field of Classification Search
CPC ...... G05D 1/0214; G05D 1/12; G05D 1/0094; G05D 1/0246; G05D 1/0255; G05D 1/0242; B60W 60/00256; B25J 11/008; B25J 9/1674; B25J 9/1697; B25J 9/1664; B25J 19/061; B25J 19/021; B25J 5/007
See application file for complete search history.

(56) References Cited

U.S. PATENT DOCUMENTS

| | | | | |
|---|---|---|---|---|
| 2007/0014439 A1* | 1/2007 | Ando | ................... | G08B 31/00 |
| | | | | 382/118 |
| 2008/0294287 A1* | 11/2008 | Kawano | ............ | G05B 19/4189 |
| | | | | 901/1 |
| 2009/0210142 A1* | 8/2009 | Couckuyt | .......... | G01C 21/3461 |
| | | | | 701/532 |
| 2012/0173113 A1* | 7/2012 | Pilutti | ............... | B60W 30/0953 |
| | | | | 701/96 |
| 2017/0225336 A1* | 8/2017 | Deyle | ...................... | B25J 5/007 |
| 2018/0165931 A1* | 6/2018 | Zhang | .................... | G06V 20/52 |
| 2018/0181813 A1* | 6/2018 | Sun | ...................... | G06K 9/6273 |
| 2020/0023765 A1 | 1/2020 | Lee | | |
| 2020/0400275 A1* | 12/2020 | Romano | ................. | F16P 3/144 |

FOREIGN PATENT DOCUMENTS

KR 10-2019-0107617 9/2019

* cited by examiner

*Primary Examiner* — Rachid Bendidi
*Assistant Examiner* — Abdalla A Khaled
(74) *Attorney, Agent, or Firm* — Ked & Associates, LLP

(57) ABSTRACT

Disclosed is a mobile robot. The mobile robot may include a body and a controller. The mobile robot may execute an artificial intelligence (AI) algorithm and/or a machine learning algorithm, and may perform communication with other electronic devices in a 5G communication environment. Accordingly, user convenience can be significantly improved.

18 Claims, 11 Drawing Sheets

MOBILE ROBOT AND METHOD FOR OPERATING THE SAME

CROSS-REFERENCE TO RELATED APPLICATION

This application claims priority under 35 U.S.C. § 119 to Korean Application No. 10-2019-0148914 filed on Nov. 19, 2019, whose entire disclosure is hereby incorporated by reference.

BACKGROUND

1. Field

The present disclosure relates to a mobile robot and a method for operating the same.

2. Background

These days, competition in product delivery services in both online and offline markets is becoming fierce. Recently, in order to improve the convenience of customers, some retailers provide a same-day delivery service, by which customers can receive products on the same day as the order. Also, active research is being conducted on unmanned robots that transport articles, and relevant laws are being established.

A related art discloses a delivery robot having a cargo box therein for delivering an article to a destination. The delivery robot can provide a customized cargo box that meets characteristics of various articles delivered.

However, the delivery robot of the related art has deficiencies in that a suspicious target approaching the delivery robot is not monitored. As a result, the article in the delivery robot could be stolen, or the receiver of the article or the delivery robot could be exposed to external attack.

BRIEF DESCRIPTION OF THE DRAWINGS

The embodiments will be described in detail with reference to the following drawings in which like reference numerals refer to like elements wherein.

DETAILED DESCRIPTION

Figure 1:
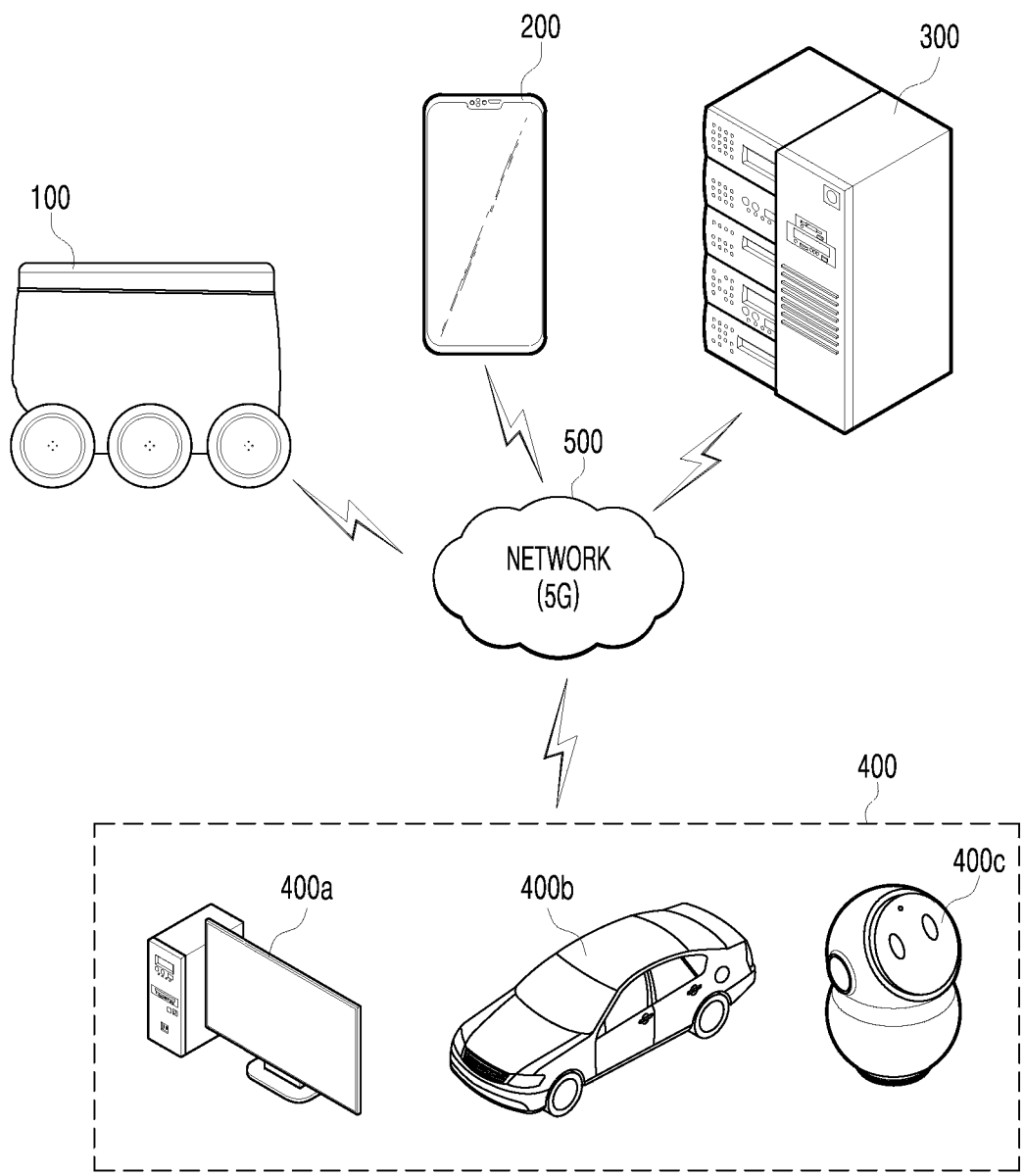
FIG. 1 is an illustration for explaining a 5G network-based cloud system according to one embodiment of the present disclosure.

Since artificial intelligence techniques may be utilized in various embodiments of the present disclosure, artificial intelligence will be generally described first. Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method. Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Reference will now be made in detail to embodiments of the present disclosure, examples of which are illustrated in the accompanying drawings. In relation to describing the present disclosure, when the detailed description of the relevant known technology is determined to unnecessarily obscure the gist of the present disclosure, the detailed description may be omitted.

FIG. 1 illustrates a 5G network-based cloud system 1000 according to one embodiment of the present disclosure. Referring to FIG. 1, the 5G network-based cloud system 1000 may include a mobile robot 100, a mobile terminal 200, a robot control system 300, various devices 400, and a 5G network 500.

The mobile robot 100 may be a movable robot 100 and may deliver various articles from a starting point to a destination. The mobile robot 100 may move directly from a warehouse to a destination by itself, or may be loaded in a vehicle and moved from the warehouse to the vicinity of the destination of the article, and then unloaded from the vehicle in the vicinity of the destination to move to the destination. The starting point and the destination of the mobile robot 100 may be variously set.

Also, the mobile robot 100 may deliver an article to the destination not only outdoors but also indoors. The mobile robot 100 may be embodied as an automated guided vehicle (AGV), and the AGV may be a transport device that is moved by, for example, a sensor on the bottom surface thereof, a magnetic field, and a vision device.

The mobile robot 100 may include a storage area (or storage space) for storing articles. The storage area may be divided in order to store various articles therein, and various articles may be disposed in a plurality of partial storage areas. Accordingly, various articles may be prevented from being mixed with each other in the storage area.

The mobile robot 100 may transmit and receive data to and from a server and various terminals capable of performing communication through the 5G network 500. In particular, the mobile robot 100 may perform data communication with the server and terminals by using at least one of enhanced mobile broadband (eMBB), ultra-reliable and low latency communications (URLLC), or massive machine-type communications (mMTC), through the 5G network 500.

eMBB is a mobile broadband service providing, for example, multimedia content and wireless data access. In addition, improved mobile services, such as hotspots and wideband coverage for accommodating the rapidly increasing mobile traffic, may be provided through the eMBB. Through a hotspot, high-volume traffic may be accommodated in an area where user mobility is low and user density is high. Through wideband coverage, a wide and stable wireless environment and user mobility can be secured.

The URLLC service defines more stringent requirements than existing LTE in terms of reliability and transmission delay of data transmission and reception. A 5G service for manufacturing process automation in industrial fields, telemedicine, remote surgery, transportation, and safety, may correspond to an URLLC service.

mMTC is a transmission delay-insensitive service that requires a relatively small amount of data transmission. mMTC enables a much larger number of terminals, including, for example, sensors, than general mobile cellular phones to be simultaneously connected to a wireless access network. Here, the communication module of a terminal should be relatively cheap. In addition, improved power efficiency and power saving technology are required to enable the terminal to operate for several years without replacement or recharge of a battery.

The mobile terminal 200 may communicate with the mobile robot 100 through the 5G network 500. The mobile terminal 200 may be a terminal of a sender of the article or the receiver of the article. Here, the mobile terminal 200 may include mobile devices, such as a mobile phone, a smartphone, and a wearable device, such as a smartwatch, smart glasses, and a head-mounted display (HMD).

The robot control system 300 may remotely control the mobile robot 100 and respond to various requests of the mobile robot 100. For example, the robot control system 300 may perform an operation using artificial intelligent on the basis of a request of the mobile robot 100, and may communicate with a system connected to a police office and a fire station, in response to a risk notification of the mobile robot 100.

The robot control system 300 may set a route to a destination of the mobile robot 100. If there are a plurality of destinations, the robot control system 300 may set an order for the plurality of destinations.

The various devices 400 may include, for example, a personal computer (PC) 400a, an autonomous vehicle 400b, and a home robot 400c. When the mobile robot 100 arrives at the destination of an article, the mobile robot 100 may give the article directly to the home robot 400c through communication with the home robot 400c.

The various devices 400 may be connected to, for example, the mobile robot 100, the mobile terminal 200, and the robot control system 300 through the 5G network 500 in a wired or wireless manner. The 5G network 500 may include, for example, a 5G mobile communication network, a local area network, and the Internet, and provide the various devices 400 with communication environments in a wired or wireless manner.

Figure 2:
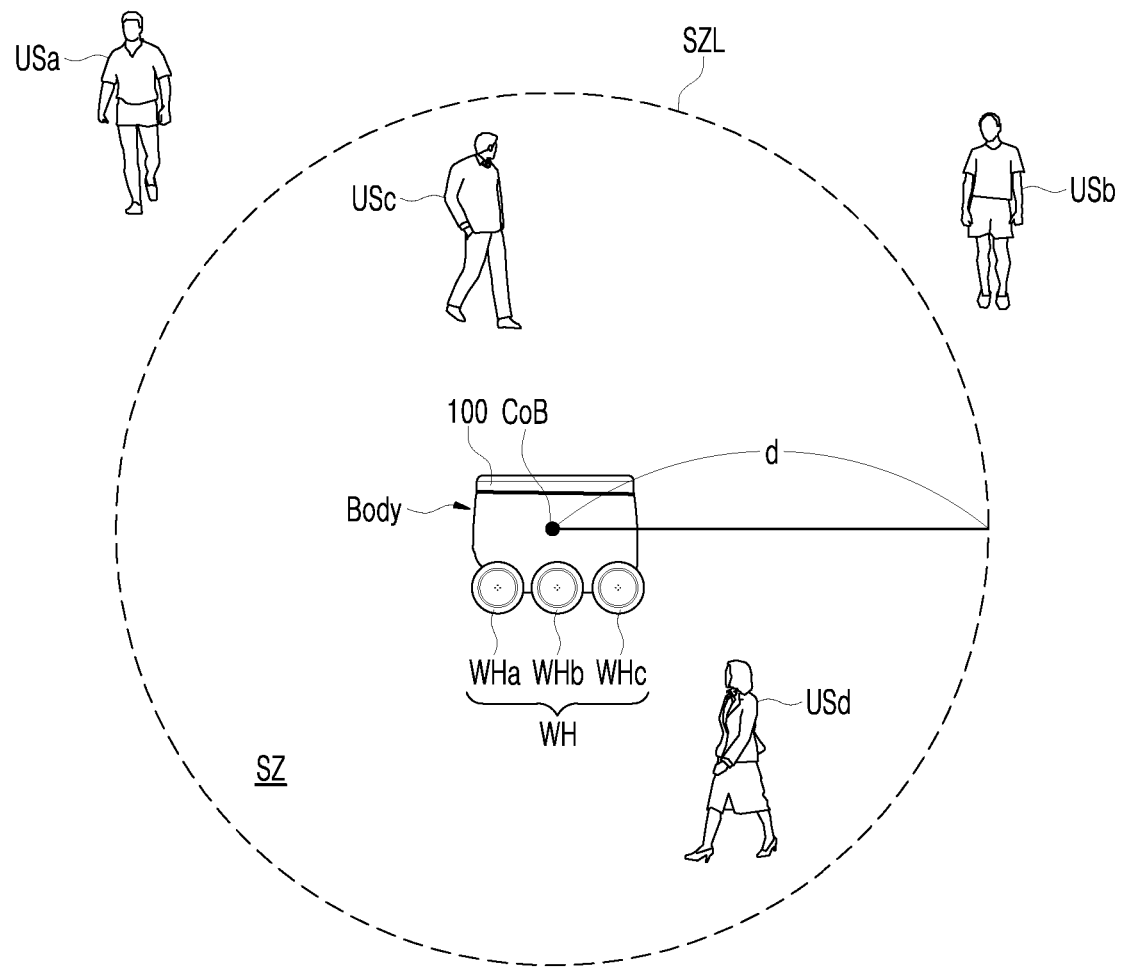
FIG. 2 is an illustration for schematically explaining a mobile robot that sets a security zone for safe delivery of an article according to one embodiment of the present disclosure.

FIG. 2 is an illustration for schematically explaining a mobile robot 100 that sets a security zone for safe delivery of the article according to one embodiment of the present disclosure. Referring to FIG. 2, the mobile robot 100 may include a body and a plurality of wheels (WH; WHa to WHc) coupled to the body to move the body. The body may include a storage area therein for storing articles and electronic and mechanical components. The mobile robot 100 may set a security zone (SZ), and a region within a security zone line (SZL) may be the security zone.

Also, the security zone may be a region for protecting a receiver of an article and a sender of the article from various risks (such as crimes and natural disasters) and for maintaining safety, while the mobile robot 100 is moving or when the mobile robot 100 stops. For example, the mobile robot 100 may set a security zone (SZ) in order to respond to an attempt to steal the article stored in the mobile robot 100.

The mobile robot 100 may variously set the range of the security zone (SZ). For example, when the mobile robot 100 passes through a region with a relatively low public safety level, that is, a relatively dangerous region in terms of public safety, the mobile robot 100 may set a wider security zone (SZ). In an alternative embodiment, public safety levels may be collected through various servers, and may be set on the basis of a life safety map.

The security zone (SZ) may be set in the shape of a circle with a radius d, with the mobile robot 100 at the center of the circle. In alternative embodiments, the security zone (SZ) may be set in various shapes and sizes.

The mobile robot 100 may monitor the surroundings of the mobile robot 100 through various sensors and cameras. The mobile robot 100 may specify the range of the security zone (SZ) by using various sensors and cameras to be described below. The mobile robot 100 may more attentively track and monitor targets USc and USd entering the security zone (SZ), among targets USa to USd that have been recognized by the various sensors and cameras.

The mobile robot 100 may set a risk response level on the basis of the movement and the occupation time of the targets USc and USd in the security zone (SZ). The mobile robot 100 may perform various operations on the basis of the risk response level. The risk response level may be a level for assessing the degree of risk of the security zone and responding to the assessed degree of risk. Accordingly, crimes against the receiver of the article, such as a pickpocketing, may be prevented from occurring.

Figure 3:
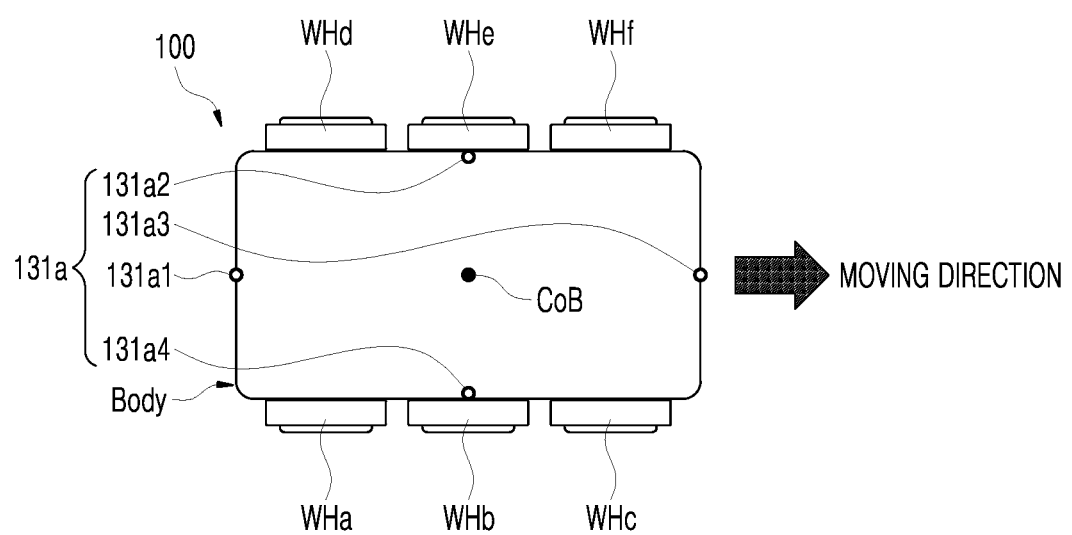
FIG. 3 is an illustration for explaining the arrangement of a plurality of distance detection sensors according to one embodiment of the present disclosure.

FIG. 3 is an illustration for explaining the arrangement of a plurality of distance detection sensors (131 in FIG. 4) according to one embodiment of the present disclosure. Hereinafter, it is assumed that a Lidar sensor (131a in FIG. 4) is disposed as an example of the distance detection sensor 131. Referring to FIG. 3, a plurality of lidar sensors 131a1 to 131a4 are disposed in the body to sense the surrounding region of the mobile robot 100. A controller (190 in FIG. 4) may sense a distance to a target through the plurality of distance detection sensors 131a1 to 131a4.

A camera (121 in FIG. 4) may be disposed at the same positions as those of the plurality of distance detection sensors 131a1 to 131a4, but if it is possible to film the surroundings of the mobile robot 100 in all directions, camera 121 may be disposed in different positions. The mobile robot 100 is able to recognize a target from a video filmed by the camera 121, and determine whether the target is the receiver of the article or a suspicious target. To this end, the mobile robot 100 may be provided with information on the receiver of the article in advance.

The mobile robot 100 may set a measurement reference point (CoB) of the mobile robot 100, and on the basis of the measurement reference point (CoB), may set a security zone. The measurement reference point (CoB) may be the center of mass, but the embodiments of the present disclosure are not limited thereto.

Figure 4:
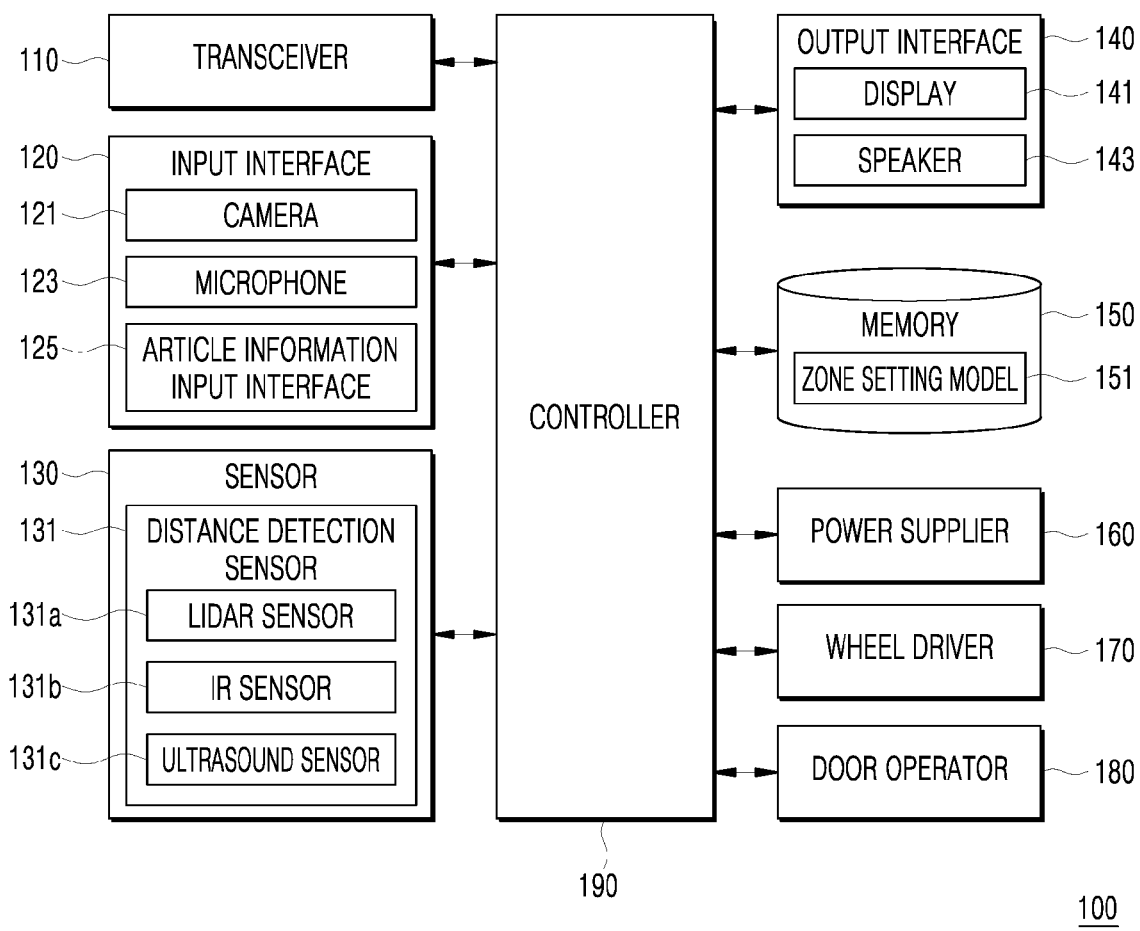
FIG. 4 is a block diagram illustrating a configuration of a mobile robot according to one embodiment of the present disclosure.

FIG. 4 is a block diagram illustrating a configuration of the mobile robot 100 according to one embodiment of the present disclosure. Referring to FIG. 4, the mobile robot 100 may include a body including a storage area, and all the components of the mobile robot 100 may be included in the body. The mobile robot 100 may include a transceiver 110, an input interface 120, a sensor 130, an output interface 140, a memory 150, a power supplier 160, a wheel driver 170, a door operator (or door motor) 180, and a controller 190. However, since the components shown in FIG. 4 are not necessarily essential for embodying the mobile robot 100, the mobile robot 100 described in this specification may have more or fewer components than those listed above.

The transceiver 110 may include a wired and wireless communication module capable of communicating with the robot control system 300 and the 5G network 500. In an alternative embodiment, the transceiver 110 may be equipped with a module for Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

The input interface 120 may include a camera 121 configured to receive input of a video signal and a microphone 123 configured to receive an audio signal. Here, the camera 121 or the microphone 123 may be regarded as a sensor, and thus a signal obtained by the camera 121 or the microphone 123 may be referred to as sensing data or sensor information.

The input interface 120 may obtain, for example, learning data for model learning and input data to be used when an output is obtained using a learning model. The input interface 120 may obtain raw input data. Here, for a preprocessing of the raw input data, the controller 190 may extract an input feature.

The input interface 120 may include an article information input interface 125, which may receive input of information on the size of the article, the destination, and the sender of the article. Here, the article information input interface 125 may be embodied as a code reader (not illustrated).

The sensor 130 may obtain at least one of internal information of the mobile robot 100, surroundings information of the mobile robot 100, or user information, by using various sensors. The sensor 130 may include, for example, a satellite-based position receiving sensor, a distance detection sensor 131, an illumination sensor, an acceleration sensor, a magnetic sensor, a gyroscope sensor, an inertial sensor, an RGB sensor, an infrared (IR) sensor, a finger scan sensor, an optical sensor, a microphone, and a magnet sensor.

Here, the distance detection sensor 131 may include a lidar sensor 131a, an infrared sensor 131b, and an ultrasound sensor 131c, and may detect an approach of a target by using the sensors. The controller 190 may recognize a receiver with proper authority on the basis of information received through the input interface 120 and the sensor 130.

The output interface 140 may generate an output related to visual, auditory, or tactile senses. The output interface 140 may include an optical output interface and a display 141 configured to output visual information, a speaker 143 configured to output auditory information, and a haptic module configured to output tactile information.

The memory 150 may store data that support various functions of the mobile robot 100. The memory 150 may store therein a plurality of application programs (or applications) to be driven in the mobile robot 100, data for operating the mobile robot 100, and commands.

In addition, the memory 150 may store information needed for performing an operation using artificial intelligence, machine learning, and an artificial neural network. The memory 150 may store a deep neural network model. The deep neural network model may be used to infer result values for new input data rather than training data. The inferred result value may be used as the basis for a judgment to perform an operation. The memory 150 may store therein a zone setting model 151, and on the basis of the zone setting model 151 stored in the memory 150, the controller 190 may variously set the range of a partial security zone with the highest security level.

The power supplier 160 may receive power from an external power source and an internal power source under the control of the controller 190 to thereby supply power to each component of the mobile robot 100. The power supplier 160 may include a battery, which may be a built-in battery or a replaceable battery. The battery may be charged by using a wired or wireless charging method, and the wireless charging method may include a magnetic induction method or a magnetic resonance method.

The wheel driver 170 may move the body by controlling a plurality of wheels. A leg driver (not illustrated) may move the body by controlling a plurality of legs under the control of the controller 190. The plurality of legs may be formed such that the mobile robot 100 can walk or run. The plurality of legs may be embodied with four legs, but the embodiments of the present disclosure are not limited thereto. The plurality of legs may be coupled to the body and integrally formed with the body. The plurality of legs may be embodied so as to be detachable from the body.

The mobile robot 100 may have the wheel driver 170 and/or the leg driver therein to move the body. This specification mainly describes an example where the wheel driver 170 is mounted to the mobile robot 100. Under the control of the controller 190, the door operator 180 may perform opening or closing of a door which exposes the storage area.

The controller 190 may be a module that controls the components of the mobile robot 100. The controller 190 may refer to a data processing device embedded in hardware, having a physically structured circuit to execute functions represented as instructions or codes included in a program. As examples of the data processing device embedded in hardware, a microprocessor, a central processing unit (CPU), a processor core, a multiprocessor, an application-specific integrated circuit (ASIC), and a field programmable gate array (FPGA) may be included, but the scope of the present disclosure is not limited thereto.

The controller 190 may set the security zone (SZ) on the basis of the body, and variably adjust the range of the security zone (SZ) on the basis of a predetermined condition. The controller 190 may adjust the range of the security zone (SZ) on the basis of at least one of information on movement time of the mobile robot 100, information on a dangerous area on a route to the destination, floating population information, or user setting information.

In the case of moving at night, the controller 190 may set the security zone (SZ) to be wider. When the mobile robot 100 passes through a region with a relatively low public safety level, that is, a relatively dangerous region in terms of public safety, the mobile robot 100 may set the security zone (SZ) to be wider. In a user-set region, the range of the security zone (SZ) may be set as intended by the user. The setting of the range of the security zone (SZ) may vary depending on the embodiments of the present disclosure.

While the mobile robot 100 is moving or is at a starting point/destination, or when the mobile robot 100 stops at an intermediate point, the controller 190 may set and adjust the security zone at regular periods or whenever an event occurs. The controller 190 may determine the risk response level on the basis of the zone occupation time and movement of a target that has entered the security zone.

Here, the target may be various obstacles including humans, animals, and vehicles. The controller 190 may monitor time information (zone occupation time information) of the target in the security zone (SZ), and monitor the target's gaze, behavior, voice, and the like in the security zone (SZ).

The controller 190 may determine the risk response level corresponding to the degree of risk. Specifically, the controller 190 may determine the risk response level on a scale of, for example, 0 (safe) to 3 (very dangerous) on the basis of the degree of risk.

For example, if no suspicious target is present in the security zone, the controller 190 may set the degree of risk as 0, and determine the risk response level to be 0 (a safe state). If a target is present in the vicinity of a security zone line within the security zone for a predetermined time, or no suspicious target is present while a receipt of the article is in progress, the controller 190 may set the degree of risk as 1, and determine the risk response level to be 1 (an alert state). If a suspicious target occupies the security zone for more than 20 minutes, or a suspicious target is approaching the mobile robot 100 at a certain speed, the controller 190 may set the degree of risk as 2, and determine the risk response level to be 2 (a dangerous state). If a suspicious target is in close proximity to the mobile robot 100, or a suspicious target is approaching the mobile robot 100 at a certain speed while the receiver is receiving the article, the controller 190 may set the degree of risk as 3, and determine the risk response level to be 3 (a very dangerous state). The degree of risk and the risk response level may be variously determined depending on the embodiment.

The controller 190 may detect a target by using the distance detection sensor 131, and may monitor the target by using the camera 121. The camera 121 may include a vision recognition camera to recognize the target. The controller 190 may identify whether the target is the receiver or a suspicious target from a video filmed by the camera 121. The controller 190 may track the target's gaze by using the distance detection sensor 131 and the camera 121, and measure the speed of the target approaching the mobile robot 100.

Figure 5:
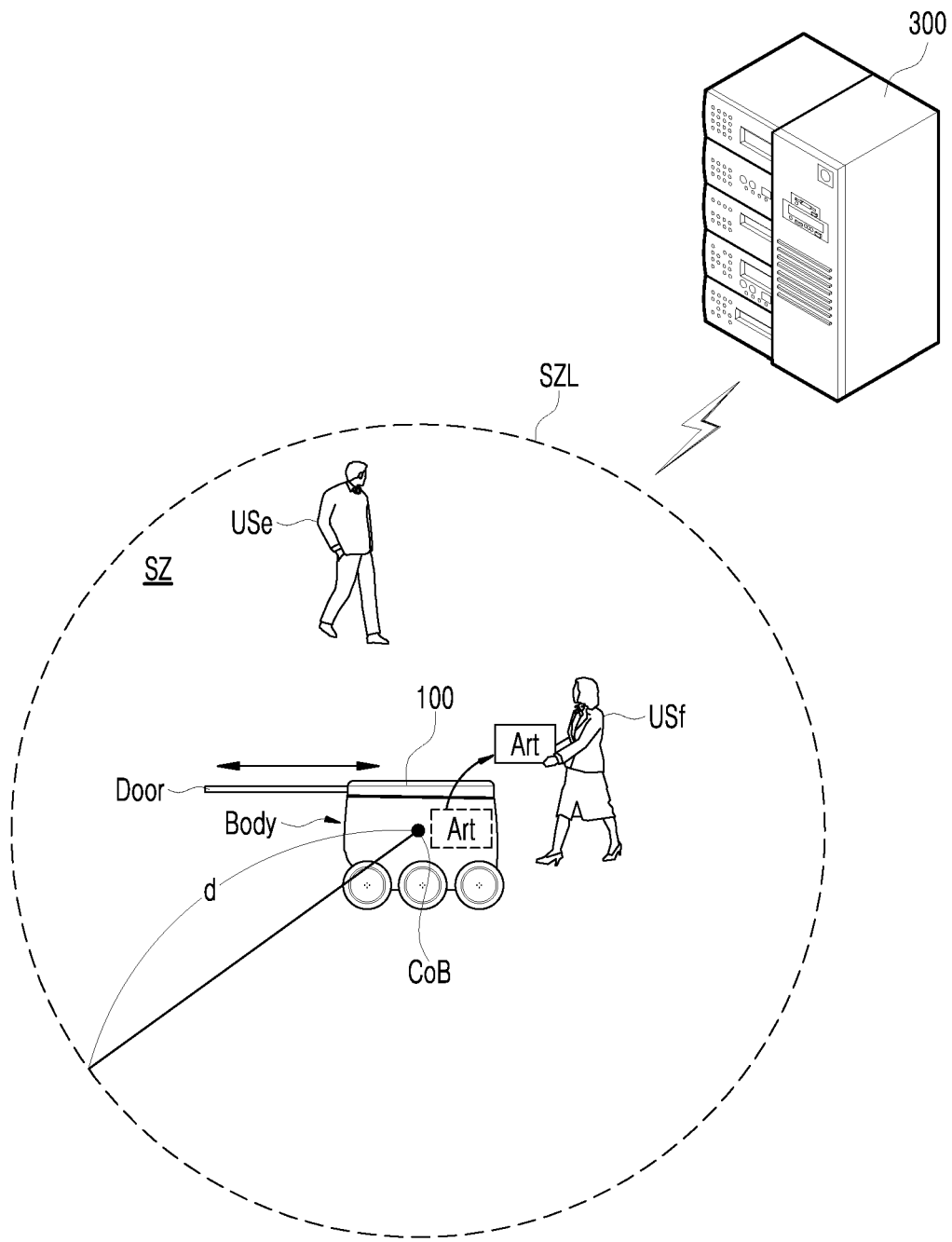
FIGS. 5 to 7 are illustrations for explaining a method for operating a mobile robot according to one embodiment of the present disclosure.
Figure 6:
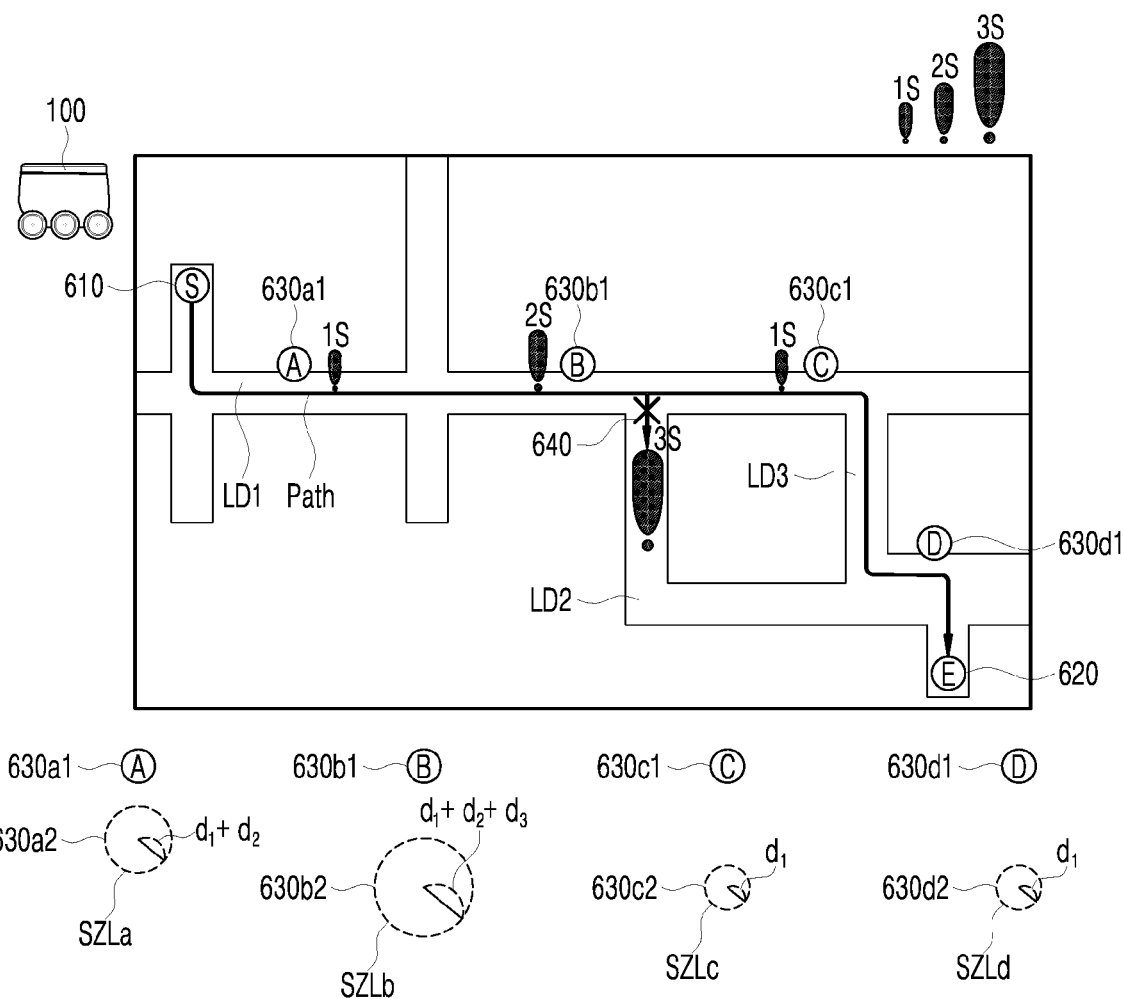
Figure 7:
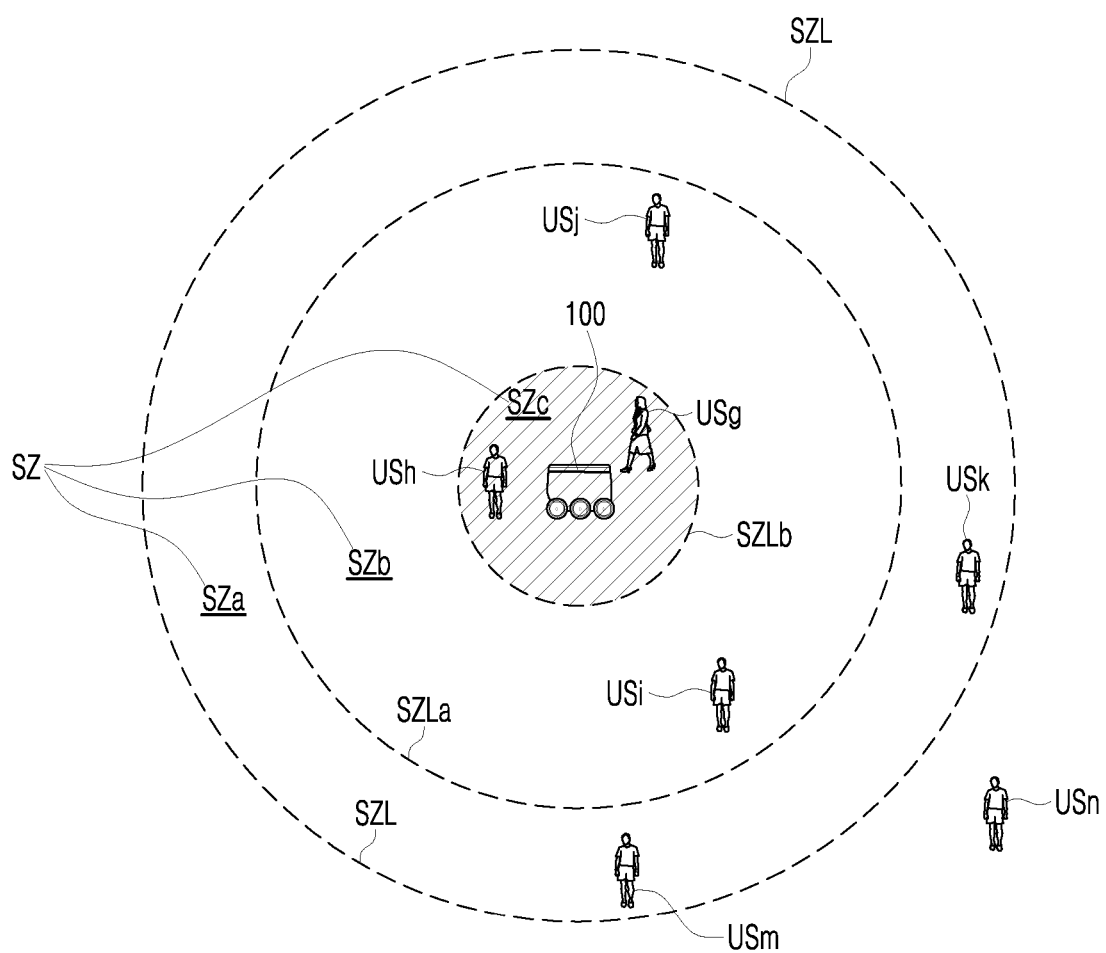

FIGS. 5 to 7 are illustrations for explaining a method for operating a mobile robot 100 according to one embodiment of the present disclosure. FIG. 5 is an illustration for explaining the operation of the mobile robot 100 at the destination according to one embodiment of the present disclosure.

When the mobile robot 100 arrives at the destination, the mobile robot 100 may set the security zone (SZ). In addition, the mobile robot 100 may monitor targets USe and USf entering the security zone (SZ) and track the gaze of the targets USe and USf by using the distance detection sensor 131 and the camera 121. In addition, the mobile robot 100 may monitor information on the approaching speed of the targets USe and USf. Hereinafter, it is assumed that the target USf is the receiver.

The controller 190 may perform a receiver authentication for the receiver USf. The mobile robot 100 may perform the receiver authentication through biometrics, password input, or code input.

When the receiver authentication is successfully performed and the target USe is present near the mobile robot 100, the controller 190 may output, on a display (not illustrated; 141 in FIG. 4), a video of the surroundings of the mobile robot 100 and a video of the target USe. The controller 190 may receive a command (for example, a voice command) from the receiver USf to open the door such that the article (Art) is exposed to the receiver USf. Then, the receiver USf may receive the article (Art).

Here, if the target USe shows a suspicious movement (for example, a sudden approach to the mobile robot 100), the controller 190 may output a warning sound through the speaker 143, and if the article (Art) is still in the storage area when the target USe shows the suspicious movement, the controller 190 may control the door operator 180 to close the door.

If the receiver USf suddenly puts the article (Art) back in the storage area after taking out the article (Art), the mobile robot 100 may rapidly close the door. In addition, the controller 190 may share the current situation by providing the video of the target Use to an external public safety system and the robot control system 300 through the transceiver 110.

In another embodiment, if a target other than the receiver USf is present around the mobile robot 100, the controller 190 may perform an additional receiver authentication for the receiver USf, or ask the receiver USf whether delivery should proceed. If the receiver USf rejects receipt of the article, the controller 190 may activate a locking system for double-locking the door.

FIG. 6 is an illustration for explaining the operation of the mobile robot 100 of setting the security zone (SZ) in various ranges according to one embodiment of the present disclosure. Referring to FIG. 6, on the route from a starting point 610 to a destination 620, the controller 190 may adjust the range of the security zone on the basis of at least one of information on movement time of the mobile robot 100, information on a dangerous area on the route to the destination 620, floating population information, or user setting information.

For example, while the mobile robot 100 is moving along a first road (LD1) by controlling the wheel driver 170, the controller 190 may set the security zone to have a radius of d1+d2 at point A (630$a$1). After the mobile robot 100 has passed through point 1S and point 2S, where public safety levels are relatively high, which means that the regions are relatively safe, the mobile robot 100 may set the security zone to have a radius of d1+d2+d3 at point B (630$b$1). Because point 3S is ahead on the route, where the public safety level is relatively low, which means that the region is relatively dangerous, the controller 190 may set the route (Path) not to pass through point 3S, and may set a bigger security zone.

In doing so, the controller 190 may control the wheel driver 170 such that the mobile robot 100 moves in the direction of a third road (LD3) instead of a second road (LD2), and the controller 190 may set the security zone to have a radius of d1 at point C (630$c$1) and point D (630$d$1).

FIG. 7 is an illustration for explaining the operation of the mobile robot 100 of setting the security zone (SZ) as a plurality of partial security zones (SZa to SZc) according to one embodiment of the present disclosure. Referring to FIG. 7, the controller 190 may divide the security zone (SZ) into a plurality of partial security zones SZa to SZc on the basis of the distance from the mobile robot 100, and may set security levels of the plurality of partial security zones SZa to SZc in such a manner that a partial security zone closer to the body has a higher security level.

The controller 190 may determine the risk response level in such a manner that a higher weighted value is given to the zone occupation time and movement of a target staying in a partial security zone with a higher security level. The risk response level may be set in such a manner that the higher the degree of risk is, the higher the risk response level is.

The controller 190 may determine a suspicious target by using different criteria in each of the plurality of partial security zones SZa to SZc. For example, if targets USm and USk occupy a first partial security zone (SZa) for a predetermined time (for example, 10 minutes), the controller 190 may set the targets USm and USk as suspicious targets, and track the targets USm and USk by giving them identification numbers (ID). In addition, if targets USi and USj occupy a second partial security zone (SZb) for a predetermined time (for example, five minutes), the controller 190 may set the targets USi and USj as suspicious targets, and track the targets USi and USj by giving them identification numbers (ID). In addition, if targets USh and USg occupy a third partial security zone (SZc) for a predetermined time (for example, one minute), the controller 190 may set the targets USh and USg as suspicious targets, and track the targets USh and USg by giving them identification numbers (ID).

Further, the controller 190 may set the range of the security zone with the highest security level (the third partial security zone (SZc)) among the plurality of partial security zones on the basis of a pre-learned zone setting model. For example, the controller 190 may receive input of the information on the movement time of the mobile robot 100, the information on a dangerous area on the route to the destination, the floating population information, the information on the value of the article, and the information on the area where a crime including robbery has occurred, as input data, and receive input of the range of the third partial security zone (SZc) as label data, to set the optimal range of the third partial security zone (SZc).

The controller 190 may be configured to control the wheel driver 170 such that the mobile robot 100 moves faster than the speed of the target, in response to the risk response level being the same as or greater than a predetermined risk response level while the mobile robot 100 is moving to the destination. In response to the risk response level being the same as or greater than a predetermined risk response level, the controller 190 may transmit a video of the target to the robot control system 300 through the transceiver 110.

The controller 190 may be configured to control the wheel driver 170 such that the mobile robot 100 moves to a changed destination, such as a place that the target cannot easily track or a relatively safe place, in response to the risk response level being the same as or greater than a predetermined risk response level while the mobile robot 100 is moving to the destination. Here, the controller 190 may control the speaker 143 to provide the target with information on the changed destination as a warning notification.

Figure 8:
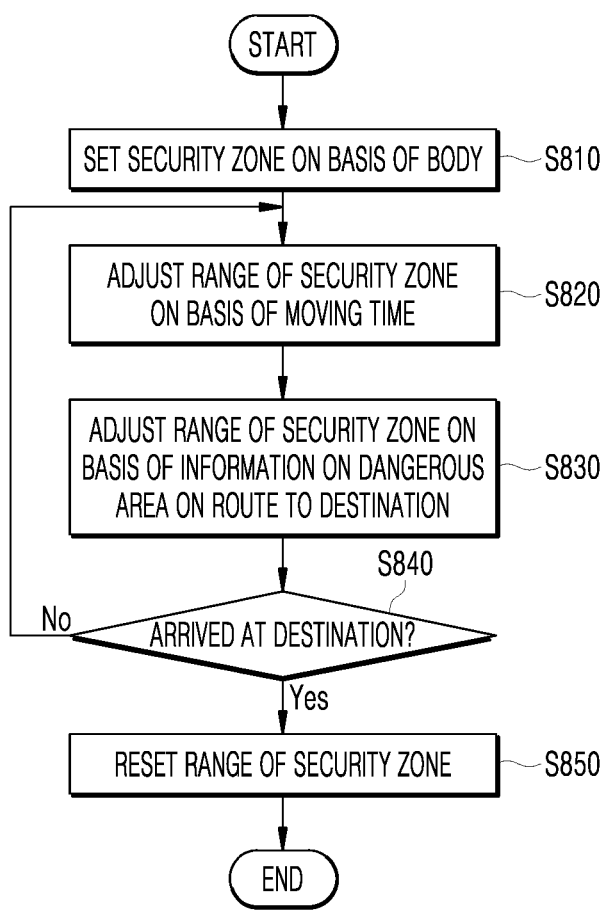
FIGS. 8 to 11 are sequence diagrams for explaining a method for operating a mobile robot according to various embodiments of the present disclosure.

FIGS. 8 to 11 are sequence diagrams for explaining a method for operating a mobile robot 100 according to various embodiments of the present disclosure. FIG. 8 is a sequence diagram for explaining a method for setting the range of the security zone according to an embodiment of the present disclosure.

First, the mobile robot 100 may set a security zone on the basis of the body of the mobile robot 100 (S810). The mobile robot 100 may adjust the range of the security zone on the basis of the movement time (S820).

That is, the mobile robot 100 may adjust the range of the security zone, wherein the mobile robot 100 may consider that a crime is more likely to occur at night than during the day, and thus may adjust the range of the security zone to be wider at night. For example, at night, the mobile robot 100 may adjust the range of the security zone to be wider than a preset security zone.

Next, the mobile robot 100 may adjust the range of the security zone on the basis of information on dangerous areas on the route to the destination (S830). For example, for a region with a relatively low public safety level on the route to the destination, the mobile robot 100 may adjust the range of the security zone to be wider.

The mobile robot 100 may repeatedly perform steps S820 and S830 until the mobile robot 100 arrives at the destination (S840). When the mobile robot 100 arrives at the destination (S840), the mobile robot 100 may reset the range of the security zone (S850).

Figure 9:
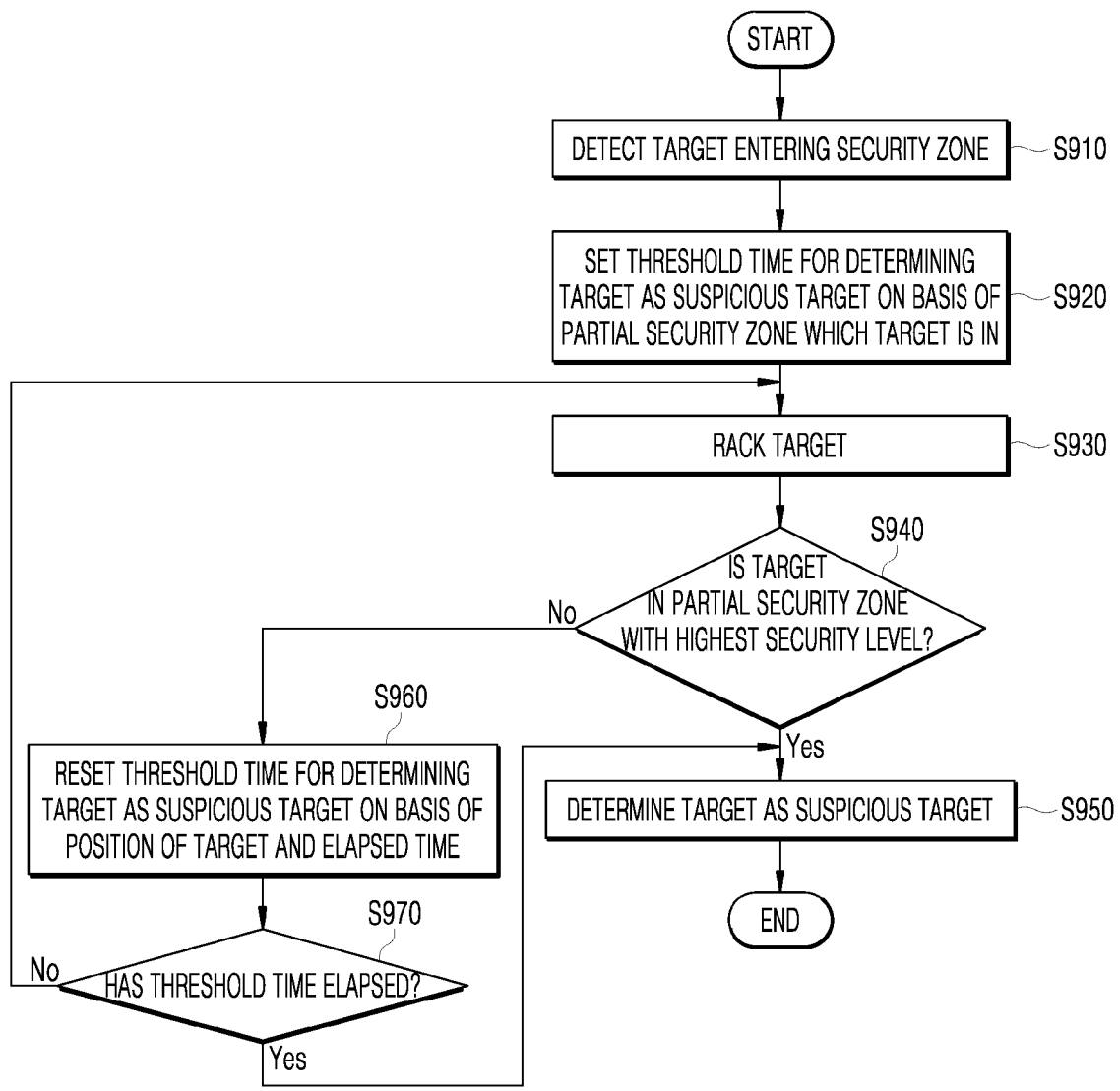

FIG. 9 is a sequence diagram illustrating a method for determining a suspicious target according to one embodiment of the present disclosure. Referring to FIG. 9, the mobile robot 100 may detect a target entering the security zone (S910). The mobile robot 100 may set a threshold time for determining a target to be a suspicious target, on the basis of the partial security zone that the target is in (S920).

The mobile robot 100 may track the target (S930), and when the target is in a partial security zone with the highest security level (S940), the mobile robot 100 may determine the target to be a suspicious target regardless of the threshold time (S950). When the target is not in the partial security zone with the highest security level (S940), the mobile robot 100 may reset the threshold time for determining a target as a suspicious target on the basis of the position of the target and the elapsed time in the security zone (S960).

Here, when the threshold time has elapsed (S970), the mobile robot 100 may determine the target as a suspicious target (S950), and if the threshold time has not elapsed (S970), the mobile robot 100 may continue to track the target (S930). The threshold time may be set to be shorter as the target is closer to the mobile robot 100, and the threshold time may be set to be longer as the target is further away from the mobile robot 100.

Figure 10:
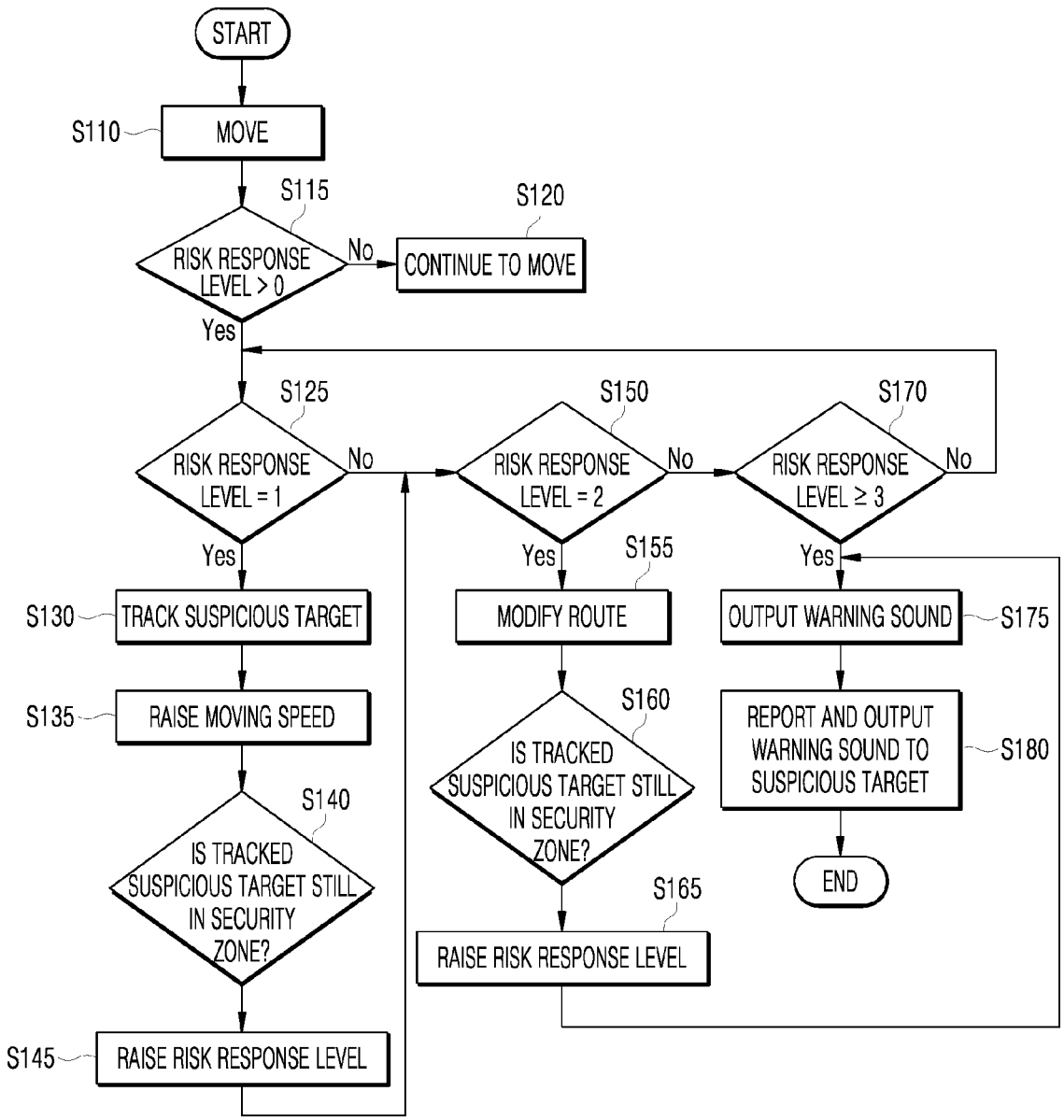

FIG. 10 is a sequence diagram for explaining the mobile robot 100 operating on the basis of the risk response level while the mobile robot 100 is moving, according to one embodiment of the present disclosure. The risk response level may be implemented on a scale of, for example, 0 to 3 corresponding to the degree of risk.

First, the mobile robot 100 may move (S110). Here, if the risk response level is 0, the mobile robot 100 may continue to move (S120). If the risk response level is 1 (S115, S125), the mobile robot 100 may track a suspicious target (S130) and raise the moving speed (S135), and if the tracked suspicious target still occupies the security zone (S140), the mobile robot 100 may raise the risk response level (S145).

If the risk response level is 2 (S150), the mobile robot 100 may modify the route to the destination (S155). The mobile robot 100 may move to a relatively safe place. If the tracked suspicious target is still in the security zone (S160), the mobile robot 100 may raise the risk response level (S165). If the risk response level is 3 or higher (S170), the mobile robot 100 may output a warning sound (S175), report to a server connected to a police office or to the robot control system 300, and output a warning sound to the suspicious target (S180).

Figure 11:
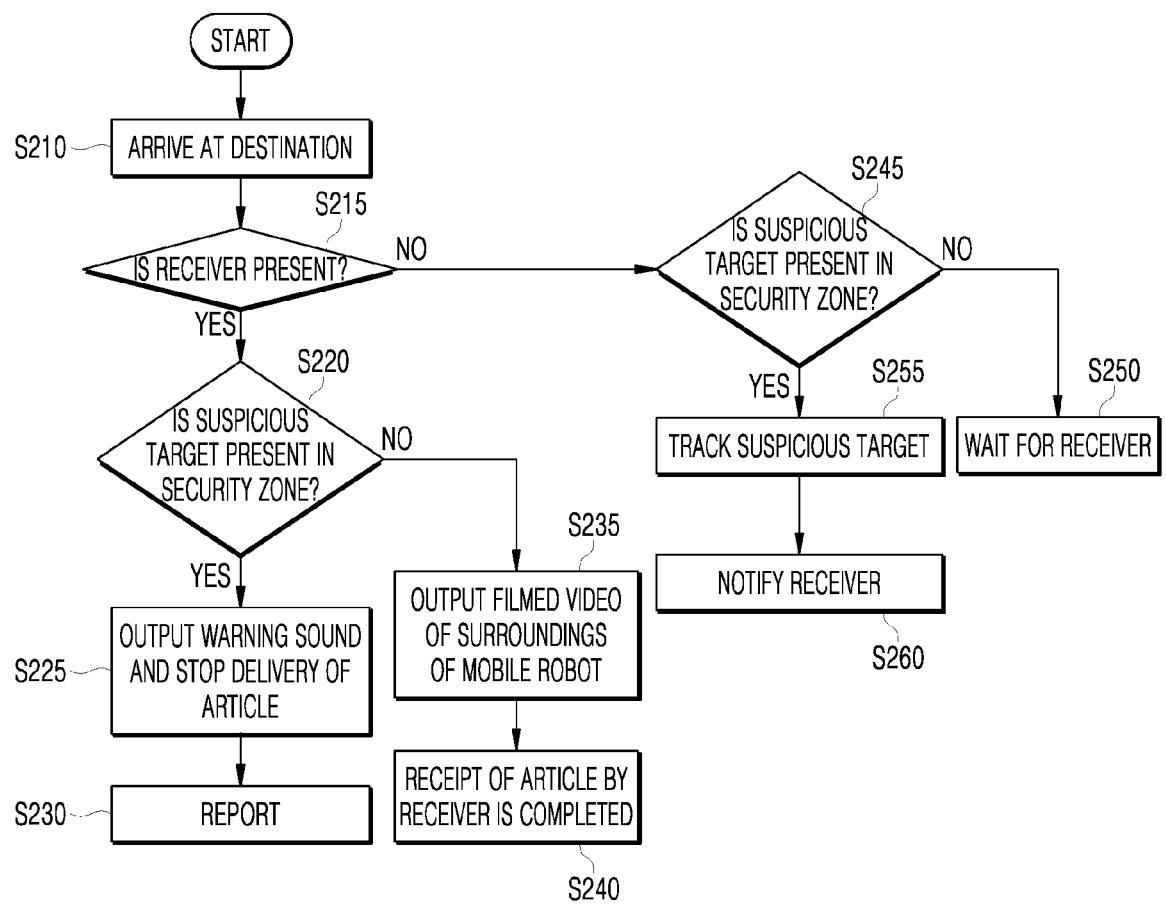

FIG. 11 is a sequence diagram for explaining the mobile robot 100 operating depending on the suspicious target at the destination, according to one embodiment of the present disclosure. First, the mobile robot 100 arrives at the destination (S210), and if the receiver is not present at the destination (S215), the mobile robot 100 may monitor whether a suspicious target is present in the security zone (S245).

If no suspicious target is present in the security zone (S245), the mobile robot 100 may wait for the receiver (S250), and if a suspicious target is present in the security zone (S245), the mobile robot 100 may track the suspicious target and provide the receiver with a notification (S255, S260). If the receiver is present at the destination (S215), the mobile robot 100 may monitor whether a suspicious target is present in the security zone (S220).

If a suspicious target is present in the security zone (S220), the mobile robot 100 may output a warning sound, stop delivery of the article (S225), and report to the robot control system 300. If no suspicious target is present in the security zone (S220), the mobile robot 100 may output the video of the surroundings of the mobile robot 100 (S235), and then the article may be received by the receiver (S240).

The present disclosure described above may be embodied as computer-readable codes on a medium on which a program is recorded. The computer-readable medium may include all kinds of recording devices in which computer-readable data is stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the controller 190 of the mobile robot 100.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

An aspect of the present disclosure is directed to providing a mobile robot and an operation method thereof, characterized by setting a security zone and monitoring a suspicious target entering the security zone. Another aspect of the present disclosure is directed to providing a mobile robot and an operation method thereof, characterized in that upon a determination that the article could be stolen or the receiver of the article could be harmed, the mobile robot stops delivery of the article and moves to a safe place. Yet another aspect of the present disclosure is directed to providing a mobile robot and an operation method thereof, characterized in that the mobile robot delivers an article accurately to the receiver who has the authority to receive the article. The present disclosure is not limited to what has been described above, and other aspects not mentioned herein will be more apparent from the following description to those skilled in the art to which the present disclosure pertains.

A mobile robot according to an exemplary embodiment of the present disclosure may include a body including a storage area and a controller configured to set a security zone on the basis of the body, adjust the range of the security zone on the basis of a predetermined condition, and determine a risk response level on the basis of a zone occupation time and movement of a target that has entered the security zone.

A method for operating a mobile robot according to another exemplary embodiment of the present disclosure may include: disposing an article in a storage area of a body; while the mobile robot is moving to a destination or after the mobile robot arrives at the destination, setting a security zone on the basis of the body and adjusting the range of the security zone on the basis of a predetermined condition; monitoring a zone occupation time and movement of a target that has entered the security zone; and determining a risk response level on the basis of the monitored zone occupation time and movement of the target.

More specifically, adjusting the range of the security zone may include adjusting the range of the security zone on the basis of at least one of information on movement time of the mobile robot, information on a dangerous area on a route to the destination, floating population information, or user setting information.

More specifically, the method for operating a mobile robot may further include: dividing the security zone into a plurality of partial security zones on the basis of a distance from the body; and setting security levels of the plurality of partial security zones in such a manner that a partial security zone that is closer to the body has a higher security level. More specifically, the method for operating a mobile robot may further include determining a suspicious target by using different criteria in each of the plurality of partial security zones.

According to various exemplary embodiments of the present disclosure, by providing a mobile robot capable of dealing with a suspicious target, an article can be safely and accurately delivered, and an accident that could be caused by external attack can be prevented.

According to various exemplary embodiments, a mobile robot may comprise a body including a storage space; and a controller configured to: set a security zone based on a location of the body, adjust a range of the security zone based on a predetermined condition, and determine a risk response level based on a zone occupation time and a movement of a target that has entered the security zone.

The controller divides the security zone into a plurality of partial security zones of respective distances from the body, and sets security levels of the plurality of partial security zones such that one of the partial security zones that is relatively closer to the body has a higher security level than another one of the partial security zones that is relatively further from the body, and the controller is configured to determine the risk response level based on a higher weighted value being given to the zone occupation time and the movement of a target in the one of the partial security zones with the higher security level in comparison to the other one of the partial security zones that is relatively further from the body and has a lower security level.

The controller is configured to determine a suspicious target by using different criteria in each of the plurality of partial security zones. The controller sets the security zone while the mobile robot is storing an article in the storage area and is moving to a destination or after the mobile robot arrives at the destination with the article in the storage area.

The predetermined condition comprises at least one of time at which the mobile robot moves, whether the mobile robot is in a dangerous area, floating population of a place where the mobile robot is located, or another condition set in advance by a user. The controller sets a range of a partial security zone with the highest security level among the plurality of partial security zones on the basis of a zone setting model.

The mobile robot may further comprise: a distance detection sensor configured to detect entry of the target into the security zone; and a camera configured to capture at least one of an image or video of the security zone, wherein upon detection of the target entering into the security zone by the distance detection sensor, the controller controls the camera to monitor the target. The distance detection sensor comprises at least one of a lidar sensor, an infrared sensor, or an ultrasound sensor, and the camera comprises a vision recognition camera. The controller is configured to monitor the target that has entered the security zone by using the distance detection sensor and the camera, track the target's gaze, and monitor information on an approaching speed of the target.

The mobile robot may further comprise: a motor configured to drive at least one of a plurality of wheels and/or a plurality of legs to move the body, wherein the controller is configured to control the motor such that the mobile robot moves faster than the approaching speed of the target, in response to the risk response level being the same as or greater than a particular risk response level while the mobile robot is moving to the destination.

The mobile robot may further comprise a transceiver, wherein in response to the risk response level being equal to or greater than a particular risk response level, the controller manages the transceiver to transmit an image or a video of the target to a robot control system.

When the risk response level is equal to or greater than the particular risk response level while the mobile robot is moving to the destination, the controller may control the motor such that the body moves to a changed destination that is relatively safer. The mobile robot may further comprise a speaker, wherein the controller is configured to control the speaker such that the speaker provides the target with a warning notification.

The mobile robot may further comprise a door motor configured to open and close a door to the storage area, wherein the controller is configured to perform authentication for opening the door and to selectively activate a locking system for the door.

The mobile robot may further comprise a display, wherein the controller is configured to: upon arrival of the mobile robot at the destination of the article positioned in the storage area, perform a receiver authentication for a receiver of the article; when the receiver authentication is successful and the risk response level is equal to or lower than the particular risk response level, control the display to provide the receiver with an image or a video of at least one region surrounding of the mobile robot; and control the door motor such that the storage area is exposed to the receiver.

The controller may be configured to: when the risk response level changes to be equal to or greater than the particular risk response level, output a warning sound through the speaker; and when the article is still in the storage area, control the door motor to close the door of the storage area. The controller may be configured to control the transceiver to transmit the image or the video of the target to the robot control system based on outputting the warning sound through the speaker.

In certain implementations, a method for operating a mobile robot may comprise: receiving an article in a storage area of a body of the mobile robot; while the mobile robot is moving to a destination or after the mobile robot arrives at the destination, setting a security zone based on a location the body and adjusting a range of the security zone based on the a predetermined condition; monitoring a zone occupation time and a movement of a target that has entered the security zone; and determining a risk response level based on the zone occupation time and the movement of the target.

The predetermined condition comprises at least one of time at which the mobile robot moves, whether the mobile robot is in a dangerous area, floating population of a place where the mobile robot is located, or another condition set in advance by a user.

The method may further comprise: dividing the security zone into a plurality of partial security zones at respective distances from the body; and setting security levels of the plurality of partial security zones such that one of the partial security zones that is closer to the body has a higher security level than another one of the partial security zones that is further from the body. The method may further comprise determining a suspicious target by using respective different criteria for each of the plurality of partial security zones.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot, comprising:
a body including a storage space;
a motor configured to drive at least one of a plurality of wheels or a plurality of legs to move the body; and
a controller configured to:
set a security zone based on a location of the body, wherein the body is at a center of the set security zone,
adjust a range of the security zone based on a predetermined condition, and
determine a risk response level based on a zone occupation time and a movement of a target that has entered the security zone,
wherein the controller is configured to control the motor such that the mobile robot moves faster than an approaching speed of the target in response to the risk response level being equal to or greater than a particular risk response level while the mobile robot is moving to a destination,
wherein the controller divides the security zone into a plurality of partial security zones of respective distances from the body, and sets security levels of the plurality of partial security zones such that one of the partial security zones that is relatively closer to the body has a higher security level than another one of the partial security zones that is relatively further from the body,
wherein the controller is configured to determine a suspicious target by using different criteria in each of the plurality of partial security zones, and
wherein the predetermined condition includes at least one of time at which the mobile robot moves, whether the mobile robot is in a dangerous area, a floating population of a place where the mobile robot is located, or another condition set in advance by a user.

2. The mobile robot according to claim 1, wherein the controller is configured to determine the risk response level based on a higher weighted value being given to the zone occupation time and the movement of the target in the one of the partial security zones with the higher security level in comparison to the other one of the partial security zones that is relatively further from the body and has a lower security level.

3. The mobile robot according to claim 1, wherein the controller divides the security zone into a plurality of partial security zones, and
wherein the controller sets a range of a partial security zone with a predetermined security level among the plurality of partial security zones based on a zone setting model.

4. The mobile robot according to claim 1, further comprising:
a distance detection sensor configured to detect entry of the target into the security zone; and
a camera configured to capture at least one of an image or a video of the security zone,
wherein upon detection of the target entering into the security zone by the distance detection sensor, the controller controls the camera to monitor the target.

5. The mobile robot according to claim 4, wherein the distance detection sensor includes at least one of a lidar sensor, an infrared sensor, or an ultrasound sensor, and the camera includes a vision recognition camera.

6. The mobile robot according to claim 4, wherein the controller is configured to monitor the target that has entered the security zone by using the distance detection sensor and the camera, track a gaze of the target, and monitor information on an approaching speed of the target.

7. The mobile robot according to claim 1, further comprising a transceiver, wherein in response to the risk response level being equal to or greater than a particular risk response level, the controller manages the transceiver to transmit an image or a video of the target to a robot control system.

8. The mobile robot according to claim 1, wherein when the risk response level is equal to or greater than the particular risk response level while the mobile robot is moving to the destination, the controller controls the motor such that the body moves to a changed destination that is relatively safer.

9. The mobile robot according to claim 8, further comprising a speaker, wherein the controller is configured to control the speaker such that the speaker provides the target with a warning notification.

10. The mobile robot according to claim 9, further comprising a door motor configured to open and close a door to the storage space,
wherein the controller is configured to perform authentication for opening the door and to selectively activate a locking system for the door.

11. The mobile robot according to claim 10, further comprising a display,
wherein the controller is configured to:
upon arrival of the mobile robot at a destination of an article positioned in the storage space, perform a receiver authentication for a receiver of the article;
when the receiver authentication is successful and the risk response level is equal to or lower than the particular risk response level, control the display to provide the receiver with an image or a video of at least one region surrounding of the mobile robot; and
control the door motor such that the storage space is accessible to the receiver.

12. The mobile robot according to claim 11, wherein the controller is configured to, when the risk response level changes to be equal to or greater than the particular risk response level:
output a different warning sound through the speaker; and
when the article is still in the storage area, control the door motor to close the door of the storage space.

13. The mobile robot according to claim 12, wherein the controller is configured to control the transceiver to transmit the image or the video of the target to a robot control system based on outputting the warning sound through the speaker.

14. A method for operating a mobile robot, comprising:
receiving an article in a storage space of a body of the mobile robot;
while the mobile robot is moving to a destination or after the mobile robot arrives at the destination, setting, by a controller of the mobile robot, a security zone based on a location of the body of the mobile robot and adjusting a range of the security zone based on a predetermined condition;
wherein the body is at a center of the set security zone,
monitoring, by the controller of the mobile robot, a zone occupation time and a movement of a target that has entered the security zone; and
determining, by the controller of the mobile robot, a risk response level based on the zone occupation time and the movement of the target,
wherein the mobile robot further includes a motor configured to drive at least one of a plurality of wheels or a plurality of legs to move the body of the mobile robot, and the method further comprises:
controlling, by the controller, the motor such that the mobile robot moves faster than an approaching speed of the target in response to the risk response level being equal to or greater than a particular risk response level while the mobile robot is moving to a destination;
dividing, by the controller, the security zone into a plurality of partial security zones of respective distances from the body of the mobile robot, and setting, by the controller, security levels of the plurality of partial security zones such that one of the partial security zones that is relatively closer to the body of the mobile robot has a higher security level than another one of the partial security zones that is relatively further from the body of the mobile robot; and
determining, by the controller, a suspicious target by using different criteria in each of the plurality of partial security zones,
wherein the predetermined condition includes at least one of a time at which the mobile robot moves, whether the mobile robot is in a dangerous area, a floating population of a place where the mobile robot is located, or another condition set in advance by a user.

15. The method according to claim 14, further comprising:
determining the risk response level based on a higher weighted value being given to the zone occupation time and the movement of the target in the one of the partial security zones with the higher security level in comparison to the other one of the partial security zones that is relatively further from the body and has a lower security level.

16. The method according to claim 14, further comprising:
detecting, by a distance detection sensor of the mobile robot, entry of the target into the security zone; and
based on detecting entry of the target entering into the security zone, capturing, by a camera of the mobile robot, at least one of an image or a video of the security zone to monitor the target.

17. The method according to claim 14, further comprising:
capturing, by a camera of the mobile robot, at least one of an image or a video of the target; and
transmitting, by a transceiver of the mobile robot and when the risk response level is equal to or greater than the particular risk response level, the at least one of the image or the video of the target to a robot control system.

18. The method according to claim 14, further comprising:
controlling the motor such that the mobile robot moves to a changed destination that is relatively safer when the risk response level is equal to or greater than the particular risk response level.

* * * * *